(12) United States Patent
Rodriguez et al.

(10) Patent No.: US 11,455,499 B2
(45) Date of Patent: Sep. 27, 2022

(54) METHOD, SYSTEM, AND COMPUTER PROGRAM PRODUCT FOR IMAGE SEGMENTATION IN A SENSOR-BASED ENVIRONMENT

(71) Applicant: Toshiba Global Commerce Solutions Holdings Corporation, Tokyo (JP)

(72) Inventors: Adrian Xavier Rodriguez, Durham, NC (US); David John Steiner, Raleigh, NC (US); Phuc Ky Do, Morrisville, NC (US); Jonathan M. Waite, Cary, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 728 days.

(21) Appl. No.: 15/927,890

(22) Filed: Mar. 21, 2018

(65) Prior Publication Data
US 2019/0294932 A1 Sep. 26, 2019

(51) Int. Cl.
*G06Q 30/00* (2012.01)
*G06K 9/62* (2022.01)
*G06Q 30/06* (2012.01)
*G06F 16/51* (2019.01)
*G06V 10/10* (2022.01)
(Continued)

(52) U.S. Cl.
CPC .......... *G06K 9/6267* (2013.01); *G06F 16/51* (2019.01); *G06Q 30/0641* (2013.01); *G06V 10/10* (2022.01); *G06V 10/96* (2022.01); *G06V 40/172* (2022.01)

(58) Field of Classification Search
CPC ..... G06Q 30/0601–0645; G06Q 30/08; G06K 9/6267; G06F 16/51; G06V 10/96; G06V 10/10; G06V 40/172

USPC ............................................. 705/26.1–27.2
See application file for complete search history.

(56) References Cited

U.S. PATENT DOCUMENTS

| | | |
|---|---|---|
| 5,497,314 A | 3/1996 | Novak |
| 7,100,824 B2 | 9/2006 | Ostrowski et al. |
| 8,146,811 B2 | 4/2012 | Kundu et al. |

(Continued)

FOREIGN PATENT DOCUMENTS

CA 3034823 A1 9/2019

OTHER PUBLICATIONS

Bishop, Todd, "How 'Amazon Go' works: The technology behind the online retailer's groundbreaking new grocery store", Dec. 5, 2016, GeekWire.com, accessed at [https://www.geekwire.com/2016/amazon-go-works-technology-behind-online-retailers-groundbreaking-new-grocery-store/] (Year: 2016).*

(Continued)

*Primary Examiner* — Jeffrey A. Smith
*Assistant Examiner* — Lindsey B Smith
(74) *Attorney, Agent, or Firm* — Patterson + Sheridan, LLP

(57) ABSTRACT

Method, computer program product, and system to provide efficient processing of image data representing an environment comprising a plurality of items available for selection by one or more persons are described. The method includes receiving image data from a plurality of visual sensors, segmenting the image data into a plurality of image segments and classifying the data into predefined image categories. The method also includes identifying an image processing task having a predefined association with the first image category and executing the identified image processing task.

18 Claims, 8 Drawing Sheets

(51) Int. Cl.
*G06V 10/96* (2022.01)
*G06V 40/16* (2022.01)

(56) References Cited

U.S. PATENT DOCUMENTS

| | | | |
|---|---|---|---|
| 8,488,881 | B2 | 7/2013 | Feris et al. |
| 8,494,909 | B2 | 7/2013 | Goncalves |
| 8,746,557 | B2 | 6/2014 | Connell, II et al. |
| 2009/0272801 | A1 | 11/2009 | Connell, II et al. |
| 2009/0316988 | A1* | 12/2009 | Xu ................... G06K 9/6857 382/173 |
| 2010/0217678 | A1 | 8/2010 | Goncalves |
| 2010/0278425 | A1* | 11/2010 | Takemoto ............... G06T 7/10 382/173 |
| 2011/0295704 | A1* | 12/2011 | Edwards ............... G06Q 30/02 705/16 |
| 2015/0012396 | A1* | 1/2015 | Puerini ............. G06K 9/00771 705/28 |
| 2015/0054959 | A1 | 2/2015 | He et al. |
| 2015/0310601 | A1 | 10/2015 | Rodriguez et al. |
| 2016/0110700 | A1* | 4/2016 | Brosnan ............... G06V 10/10 705/22 |
| 2017/0083884 | A1 | 3/2017 | Vilmosh et al. |
| 2017/0323376 | A1* | 11/2017 | Glaser .................. G06Q 20/203 |
| 2018/0253772 | A1* | 9/2018 | Ellison ............... G06Q 30/0641 |
| 2019/0034897 | A1* | 1/2019 | Gao .................... G06Q 20/202 |

OTHER PUBLICATIONS

Requistion by Examiner for Application No. 3034823 dated Apr. 29, 2020.
Bing-Fei Wu, et al., "An intelligent self-checkout system for smart retail", 2016 International Conference on System Science and Engineering (ICSSE), National Chi Nan University, Taiwan, Jul. 7-9, 2016 [abstract only].
Russell Bobbit, et al., "Visual item verification for fraud prevention in retail self-checkout", 2011 IEEE Workshop on Applications of Computer Vision (WACV), Kona, HI, USA, Jan. 5-7, 2011 [abstract only].
Pham et al., "BiSeg: Simultaneous Instance Segmentation and Semantic Segmentation with Fully Convolutional Networks", Jul. 18, 2017, pp. 1-12. <https://arxiv.org/pdf/1706.02135.pdf>.
GitHub—msracver/FCIS: Fully Convolutional Instance-aware Semantic Segmentation, © 2018 GitHub, Inc., 5 pages. <https://github.com/msracver/FCIS>.
Canadian Intellectual Property Office Action for Application No. 3034823 dated Jan. 20, 2021.
Canadian Intellecutal Property Office Action for Application No. 3034823 dated Oct. 18, 2021.

* cited by examiner

METHOD, SYSTEM, AND COMPUTER PROGRAM PRODUCT FOR IMAGE SEGMENTATION IN A SENSOR-BASED ENVIRONMENT

BACKGROUND

The present disclosure relates to a sensor-based environment, and more specifically, to providing techniques for efficient processing of image data representing the sensor based environment comprising a plurality of items available for selection by one or more persons.

Figure 1:
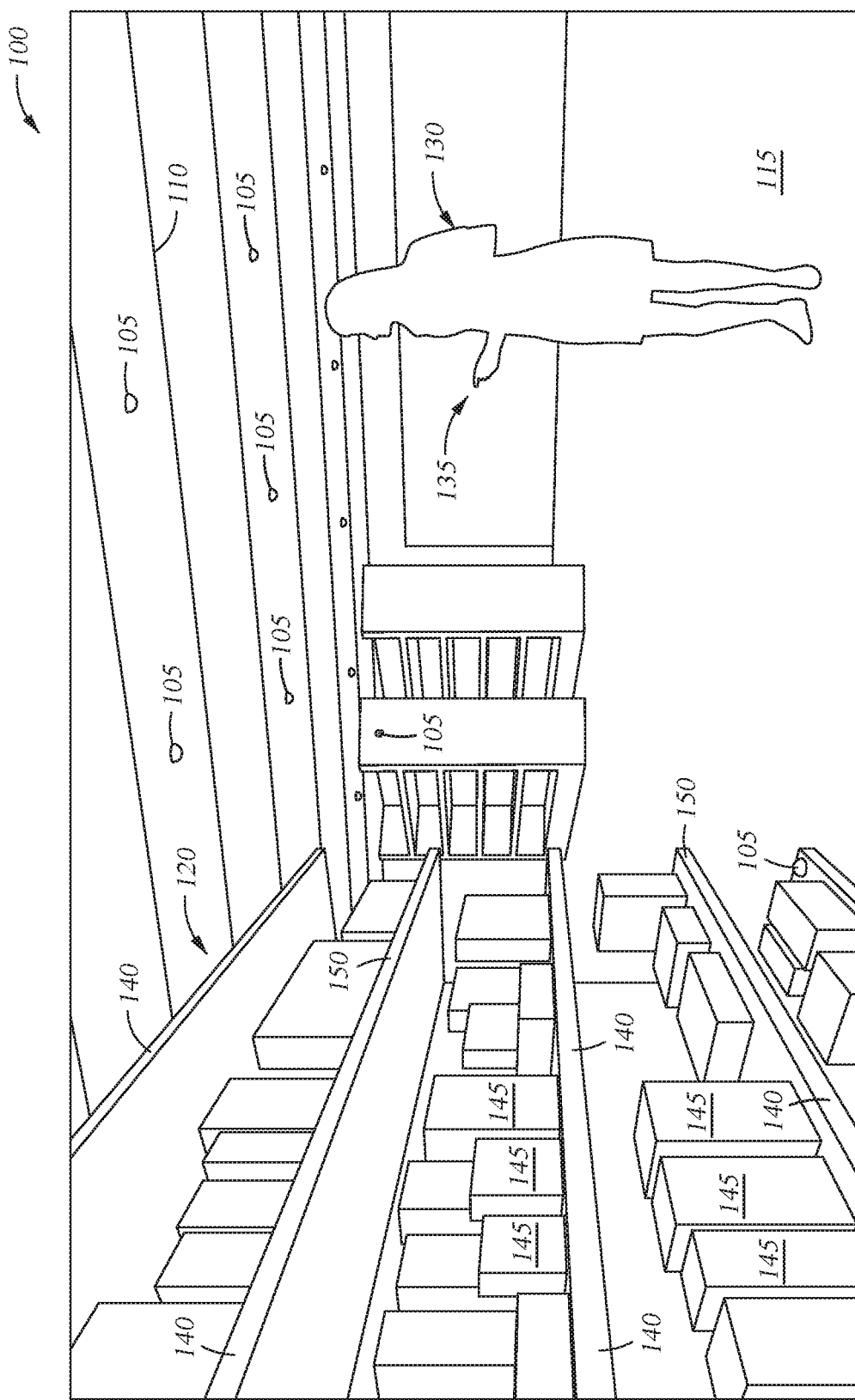
FIG. 1 illustrates an exemplary environment including a plurality of items, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Aspects of the current disclosure relate to an integrated environment capable of providing a personalized, automated, and adaptive experience for a person within the environment. A number of different sensor devices may be employed within the environment, and networked with various computing devices such as point-of-sale (POS) terminals, digital signage, servers, and mobile or handheld computing devices to provide a seamless integration of mobile technologies and e-commerce into traditional experiences.

Using a system having one or more visual sensors within the environment, a retailer or other provider may acquire and process environmental data, such as image data, to maintain a virtual transaction record reflecting a person's interactions with various items in the environment. The virtual transaction record may include an updated listing of items (i.e., including a first item set) that have been selected by a person for presentation during a subsequent checkout transaction, which may be indicated by placing the items within a shopping receptacle. Additionally, image information including the shopping receptacle may be acquired at various locations within the environment, and image processing performed to identify second or subsequent set(s) of items within the shopping receptacle at different points in time.

Acquiring the image information and determining the item sets helps to streamline or facilitate checkout transactions for one or more persons in the environment. Identification logic may be applied to identify the person and the payment information associated with the person prior to a checkout transaction. Transaction logic may be applied to determine the number of items and the cost of the items in a shopping receptacle associated with the identified person. Audit logic may be applied to the acquired image information and item sets to adaptively determine the level of review or scrutiny that will be applied to the person's checkout transaction. The audit logic may implement rigid legal and/or corporate requirements, as well as any loss-prevention or security considerations that may be tailored to the circumstances. In some embodiments, the audit logic may determine whether an audit should be performed on a given checkout transaction, as well as the scope of the audit. Audits generally include actions of varying degrees of intrusiveness, to be performed by the person (e.g., a customer) or by another, such as an employee.

The application of image segmentation will reduce the time and resources needed to process the variety of image data. For example, instead of requiring an image processing task to process an entire image including extraneous image data that is not related to the image processing task, the image segmentation in the environment logic described herein provides for the image processing task to only process image data which is associated with the specific task. This provides faster processing of image data and may reduce the time required for a person to perform their checkout transaction, improving their overall experience and minimizing disruptions. The reduced time also increases the collective throughput at the checkout area and/or checkout terminals. In some cases, the adaptive audit logic may enable a completely "touchless" checkout transaction, with the person completing the checkout transaction simply by departing the environment, without being required to stop at a checkout terminal or in the checkout area. While generally discussed within the context of a shopping environment, such as a retail store, it is contemplated that the techniques disclosed herein may be applied to other environments (some non-limiting examples include libraries, museums, classrooms, hospitals, etc.) to provide a similar experience for persons included therein.

FIG. 1 illustrates an exemplary environment including a plurality of items, according to one embodiment. The environment 100 includes a plurality of sensor modules 105 disposed in the ceiling 110 of the environment. The sensor modules 105 may each include one or more types of sensors, such as video sensors (e.g., cameras), audio sensors (e.g., microphones), and so forth. Sensor modules 105 may also include actuating devices for providing a desired position and/or orientation of the included sensor(s). Generally, the sensor modules or individual sensors may be disposed at any suitable location within the environment 100. Some non-limiting examples of alternative locations include below, within, or above a floor 115 of the environment, within other structural components of the environment 100 such as a shelving unit 120 or walls, and so forth. In some embodiments, sensors may be disposed on, within, or near item display areas such as the shelving unit 120. The sensors may be oriented toward expected locations of personal interactions with items in order to acquire better data about the person's interactions, such as determining the person's field of view relative to certain items, updating a virtual cart or transaction record for the person's transaction in the environment, and so forth.

The environment 100 also includes one or more shelving units 120 having shelves 140 that support various items 145. Though not shown, multiple shelving units 120 may be disposed in a particular arrangement in the environment 100, with the space between adjacent shelving units forming aisles through which people, such as customers and employees may travel. For example, customers may navigate the aisles and/or approach the shelving units 120 to view items 145 included therein, to handle the items, to select the items, etc. In another example, employees may navigate the aisles and/or approach the shelving units 120 to view stock levels of the items 145, to determine out-of-place items, etc. In some embodiments, the shelving units 120 may include visual sensors or other sensor devices or I/O devices. The sensors or devices may couple with the person's smartphone 135 and/or other networked computing devices (including terminals and/or servers) that are associated with the environment 100. For example, the front portions 150 of shelves 140 may include video sensors oriented outward from the shelving unit 120 (i.e., toward the aisle) to acquire image information for a person's interactions with items 145 on the shelving unit 120, with the image information provided to back-end servers for storage and/or analysis. In some cases, some or all of the image information may also be accessible by a person's mobile computing device. In some embodiments, portions of the shelving unit 120 (such as the front portions 150 of shelves 140) may include indicator lights or other visual display devices or audio output devices that are able to communicate with a person.

During an exemplary transaction in the environment, the person 130 may have a shopping receptacle in which the person places items after they are selected for purchase. Examples of shopping receptacles include shopping carts, baskets, or other containers that may be carried or otherwise transported by the person during the transaction. Upon completion of the transaction—for example, the person has selected all of the desired items—the person may approach a designated checkout area to perform a checkout transaction or approach an exit of the environment.

In some cases, the checkout transaction may have "touchless" aspects or may be entirely touchless. For example, visual sensors included in the environment may acquire image information that is usable to identify the person and other information related to the persons, items within the shopping receptacle, etc. and that streamlines or otherwise facilitates the checkout transaction. As will be discussed further herein, logic may be applied to the acquired image information to in order to efficiently process the image information and provide the frictionless checkout. Generally, the checkout and transaction logic may reflect legal and/or corporate requirements (e.g., reviewing attempted purchases of restricted items, such as tobacco or alcohol products) as well as loss-prevention or other security considerations. In some embodiments, the logic may determine whether an audit or other processing tasks should be performed on the checkout transaction, as well as the scope of the audit or other tasks. Audits may include actions of varying degrees of intrusiveness—some non-limiting examples include prompting the person (i.e., a customer) to scan or otherwise manipulate an unidentified item, prompting the person to answer a question or provide additional information, prompting the person to manually scan each item included in their shopping receptacle, prompting an employee to locate particular items of the checkout transaction, prompting the employee to perform a full review of the checkout transaction, and so forth. In some instances, the logic may determine that an audit is not required for the checkout transaction, based on the acquired image information, the virtual tracking record, and/or other information such as a trust level associated with the person.

Reducing time for checkout transactions also increases the collective throughput at the checkout area. In some cases, the person may be able to complete a checkout transaction simply as part of departing the environment, without requiring the person to stop at a checkout terminal or in the checkout area. In some cases, the person's time in the checkout area may be significantly reduced, such as only a momentary pause at a checkout terminal. In order to for a computing system of the environment to efficiently provide the frictionless checkout, efficient processing of image data through image segmentation is required.

Figure 2:
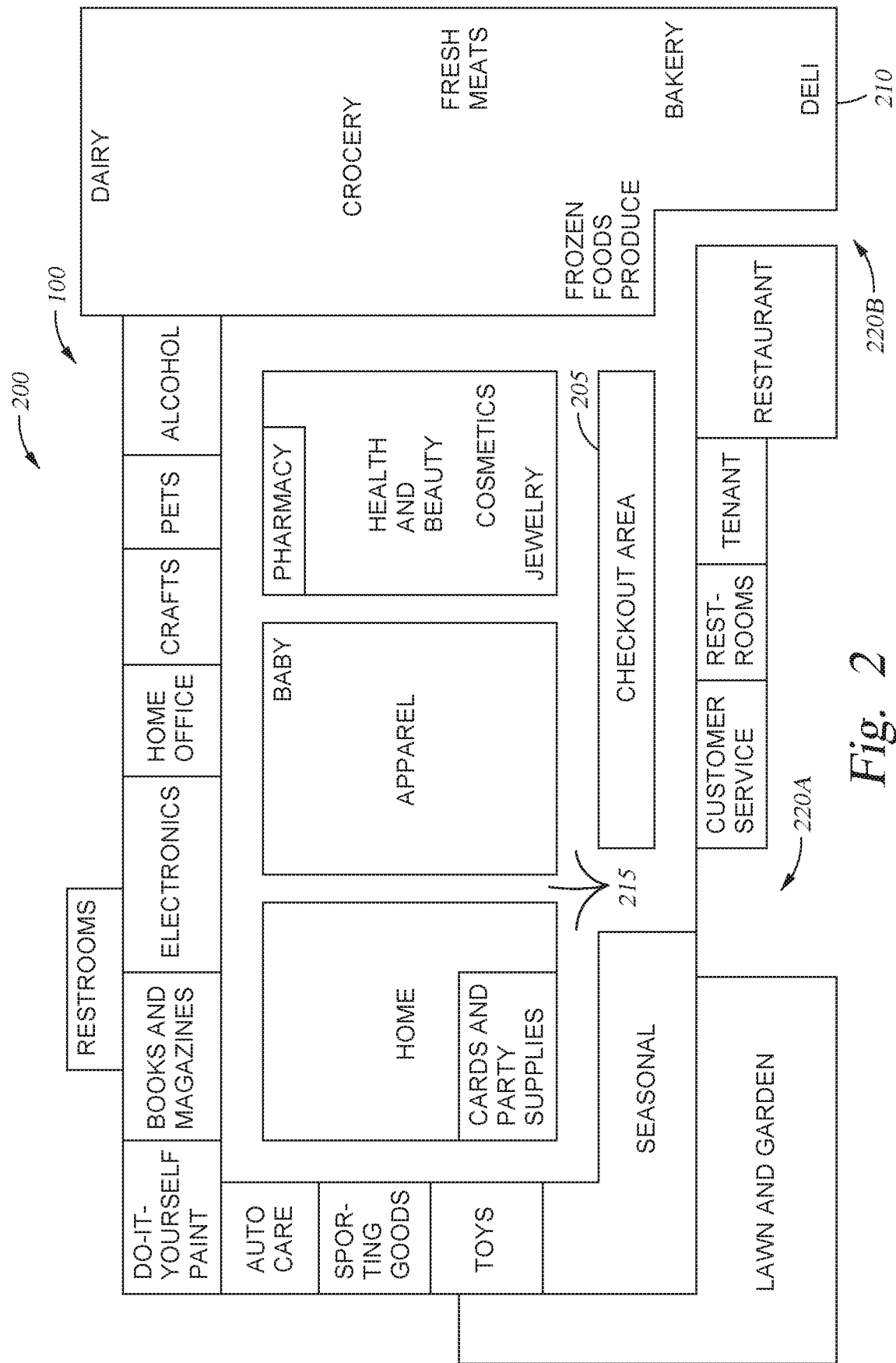
FIG. 2 illustrates an exemplary layout of an environment, according to one embodiment.

FIG. 2 illustrates an exemplary layout of an environment, according to one embodiment. Specifically, FIG. 2 depicts a projection of an exemplary floor plan 200 for the environment 100. The floor plan 200 includes areas corresponding to different departments, each of which includes a number of items available for selection and purchase. The departments (no reference numbers) are labeled with the corresponding name (e.g., "Home," "Apparel," "Seasonal," etc.). Departments, such as grocery department 210, may be further subdivided into sub-departments (e.g., "Dairy," "Fresh Meats," etc.). Although not depicted, each department may include a number of shelving units or other structure that is suitable for storing, containing, and/or displaying items. The departments may be separated by one or more pathways 215, along which a person may travel to beneficially avoid navigating through certain departments.

During an exemplary transaction, a person (e.g., a customer of the environment 100) may enter any number of departments and interact with various items included therein. Some examples of interactions include viewing items, handling items, selecting items for purchase, adding items to a shopping receptacle, and so forth. Upon completion of the transaction, the person may transport selected items to a designated checkout area 205 having one or more checkout terminals or stations. The checkout area 205 may be disposed near points of entry into and/or exit from the environment, such as entrances/exits 220A, 220B. Checkout terminals within checkout area 205 may be manned (e.g., POS terminals) or unmanned (e.g., self-checkout terminals). A number of employees may also be assigned within or adjacent to the checkout area 205 and assist customers such as in performing audits of checkout transactions or assist in identifying persons or manually adding items to a virtual tracking record. In one example, an employee may be stationed near an exit (e.g., entrance/exit 220A or 220B) and check printed receipts following customers' checkout transactions.

Figure 3:
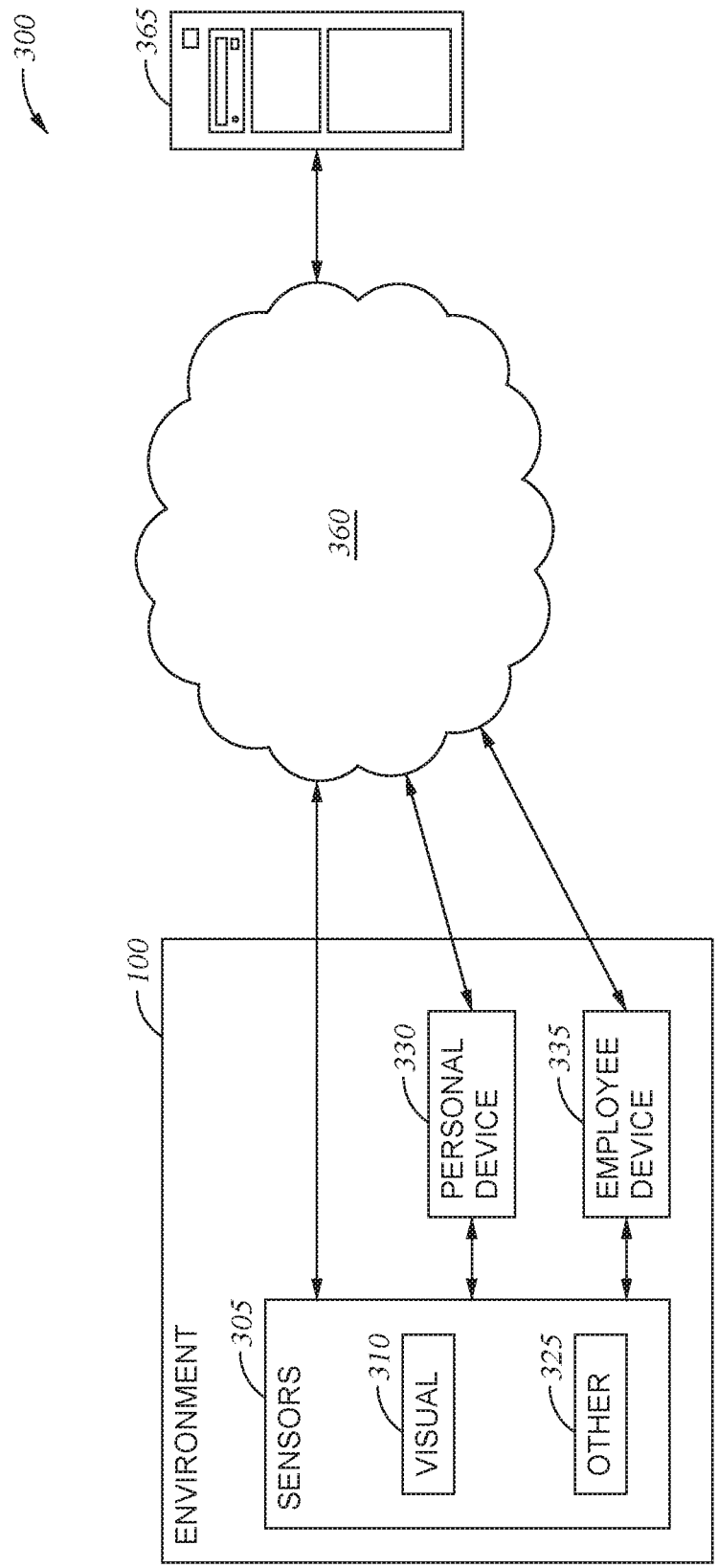
FIG. 3 illustrates an exemplary system to provide efficient processing of image data representing an environment, according to one embodiment.

FIG. 3 illustrates an exemplary system 300 to provide efficient processing of image data representing an environment, according to one embodiment. The system 300 includes a number of components that are disposed within the environment 100. The system 300 may also include components that are outside the environment 100—for example, a server 365 may be located remotely or proximately disposed to the environment (such as within a back room in the same building that is not accessible by customers).

Components within the environment 100 include one or more sensors 305 of various types, such as visual sensors 310. The sensors 305 may also include other sensors 325 capable of providing meaningful information about personal interactions within the environment, e.g., location sensors. The sensors 305 may be discrete sensor devices deployed throughout the environment 100 in fixed and/or movable locations. Sensors 305 may be statically included in walls, floors, ceilings, displays, or other non-sensor devices, or may be included in shopping receptacles capable of being transported through the environment. In one embodiment, sensors 305 may include adjustable-position sensor devices, such as motorized cameras (i.e., an example of visual sensors 310) attached to a rail, wire, or frame. In one embodiment, sensors 305 may be included on one or more unmanned vehicles configured to travel through some or all of the environment 100, such as unmanned ground vehicles (UGVs) or unmanned aerial vehicles (UAVs or "drones"). Sensors 305 may also include sensor devices that are included in computing devices associated with the environment 100, such as personal devices 330 and employee devices 335. In some cases, the computing devices (or the component sensor devices) may be implemented as body-worn or carried devices.

Personal devices 330 and employee devices 335 may each include passive or actively-powered devices capable of communicating with at least one of the networked devices of system 300. One example of a passive device (which may be worn or carried) is a NFC tag. Active devices may include mobile computing devices, such as smartphones or tablets, or body worn or carried devices such as a Google Glass™ interactive eyepiece (Glass is a trademark of Google Inc.). The personal devices 330 generally denotes ownership or possession of the devices by customers within the environment 100, while the employee devices 335 denotes ownership or possession by the retailer or other administrator of the environment 100. In some cases, employee devices 335 may be carried by employees and used in the course of their employment. Personal devices 330 and employee devices 335 may execute applications or other program code that generally enables various functions and features accessible using server 365 and/or other networked computing devices. In some embodiments, sensor devices that are included with the personal devices 330 or employee devices 335 may be included in the sensors 305.

Server 365 generally includes processor(s), memory, and communications capabilities and may perform various computing tasks to support the operation of the environment 100. Server 365 may communicate using various wired and/or wireless communications methods with sensors 305, and with other networked devices such as personal devices 330 and employee devices 335. Server 365 generally executes computer program code in which input data is received from networked devices, the input data is processed and/or stored by the servers, and output data is provided to networked devices for operation of the environment 100.

Network 360 may include one or more networks of various types, including a local area or local access network (LAN), a general wide area network (WAN), and/or a public network (e.g., the Internet). In one embodiment, various networked computing devices of the system 300 are interconnected using a LAN, and one or more computing devices (e.g., server 365, personal devices 330) include connections to the Internet and one or more cloud computing models.

Figure 4:
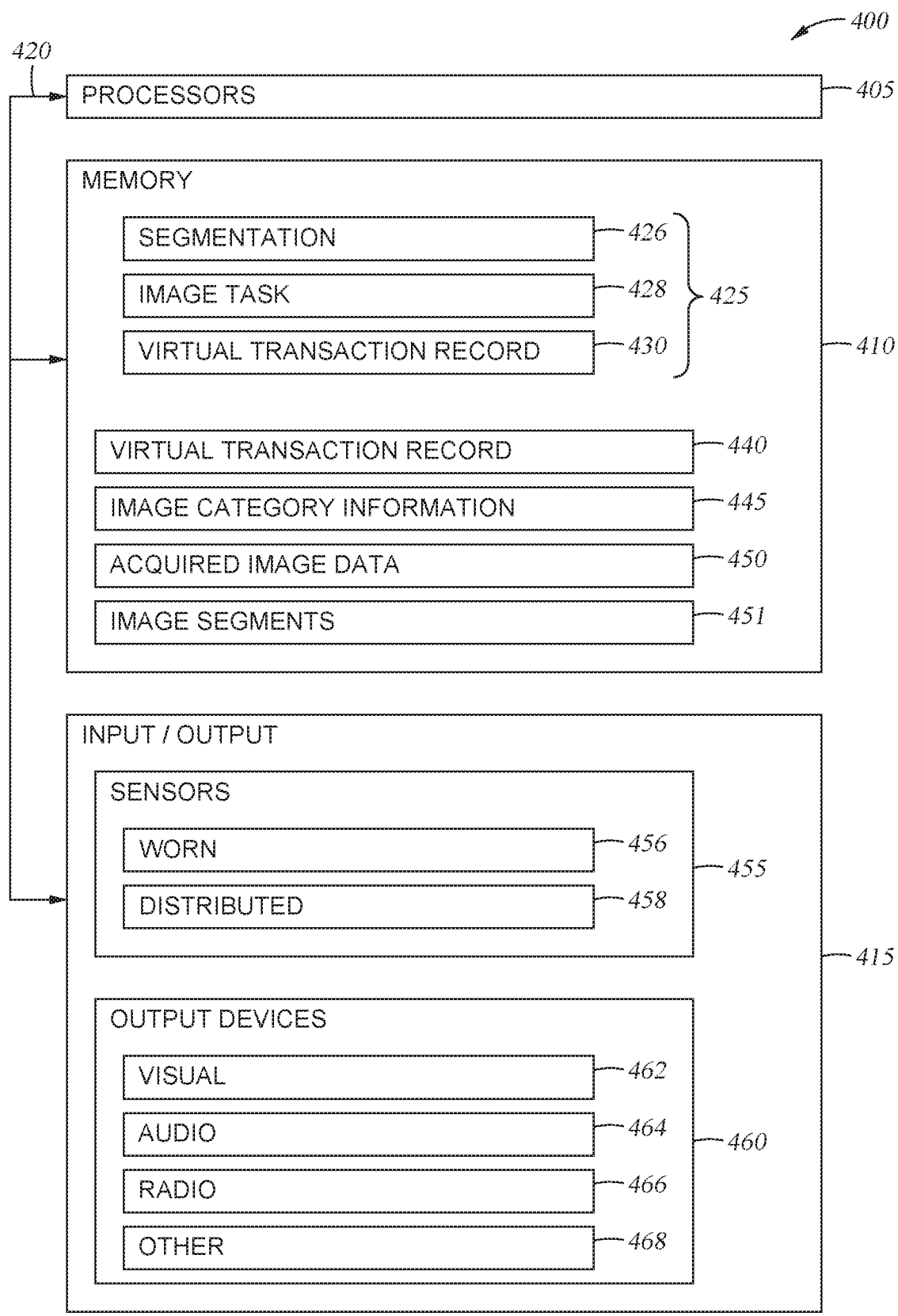
FIG. 4 is a block diagram illustrating operation of a system to provide efficient processing of image data representing an environment, according to one embodiment.

FIG. 4 is a block diagram illustrating operation of an arrangement 400 to provide efficient processing of image data representing an environment, according to one embodiment. Specifically, the arrangement 400 illustrates exemplary operation of the system 300 of FIG. 3. Arrangement 400 includes a number of processors 405, memory 410, and input/output 415, which are interconnected using one or more connections 420. In one embodiment, the arrangement 400 may be implemented as a singular computing device and connection 420 may represent a common bus. In other embodiments, arrangement 400 is distributed and includes a plurality of discrete computing devices that are connected through wired or wireless networking. The processors 405 may include any processing element suitable for performing functions described herein, and may include single or multiple core processors, as well as combinations thereof. Processors 405 may be included in a single computing device, or may represent an aggregation of processing elements included across a number of networked devices such as personal devices 330, etc.

Memory 410 may include a variety of computer-readable media selected for their size, relative performance, or other capabilities: volatile and/or non-volatile media, removable and/or non-removable media, etc. Memory 410 may include cache, random access memory (RAM), storage, etc. Storage included as part of memory 410 may typically provide a non-volatile memory for the networked computing devices (e.g., server 365), and may include one or more different storage elements such as Flash memory, a hard disk drive, a solid state drive, an optical storage device, and/or a magnetic storage device. Memory 410 may be included in a single computing device or may represent an aggregation of memory included in networked devices. Memory 410 may include a plurality of modules 425 for performing various functions described herein. As described herein, the modules 425 may be executed or performed using artificial intelligence (AI), machine learning, deep learning, neural networks and/or other big data analytics systems. These AI systems may also use proprietary models, publicly available models, or a combination of both to perform the functions described. The modules 425 generally include program code that is executable by one or more of the processors 405. As shown, modules 425 include segmentation module 426, image task module 428, and virtual transaction record module 430.

The modules 425 may also interact to perform certain functions. For example, image task module 428 may make calls or otherwise interact with virtual transaction record module 430 to update a virtual transaction record associated with a person. The person of ordinary skill will recognize that the modules provided here are merely non-exclusive examples; different functions and/or groupings of functions may be included as desired to suitably operate the environment. Memory 410 may also include virtual transaction records 440 and image category information 445, which may be accessed and/or modified by various of the modules 425. In one embodiment, the virtual transaction records 440 and the image category information 445 may be stored on the server 365 or on a separate database.

Input/output (I/O) 415 includes sensors 455, which may encompass the various sensors 305 depicted in FIG. 3. Sensors 455 may be subdivided into worn (or carried) sensors 456 that are worn or carried by persons within the environment, and distributed sensors 458 that are disposed at fixed or movable locations within the environment. I/O 415 may further include input devices (not illustrated) and output devices 460 that may be included to enhance the transaction experience for persons in the environment. In some embodiments, personal devices 330, and employee devices 335 of FIG. 3 may include output devices 460, such as visual devices 462 (e.g., visual displays, indicators) and/or audio devices 464 (e.g., speakers) for communicating with persons during their transactions. The output devices 460 may include radio devices 466 and other devices 468 that provide information to people through tactile feedback (e.g., haptic devices) or using other sensory stimuli. The input devices include suitable devices capable of receiving input from persons, such as cameras, keyboards or keypads, touchscreens, buttons, inertial sensors, etc. I/O 415 may further include wired or wireless connections to an external network (e.g., network 365) using I/O adapter circuitry.

The segmentation module 426 may process acquired image data 450 collected from one or more visual sensors 455 in conjunction with image category information 445 using known image processing techniques to detect and segment the acquired image data 450 into a plurality of image segments 451. In some examples, image segmentation may include dividing the image data into discrete parts, where each part (or segment) contains only a certain type of image data. For example, a person image segment would only contain image data for one or more persons. In some embodiments, segmentation of the image data is performed with respect to particular or predefined image categories as described herein. In some examples, the segmentation module 426 may segment the acquired image data 450 using or in conjunction with segmentation methods such as Toshiba BiSeg, Microsoft FCIS, etc. and image databases such as the COCO Common Objects in Context dataset. In some examples, the segmentation module 426 may transmit the acquired image data 450 and/or image segments 451 to a remote network or system configured to specifically process segments and/or identify items in the image data based on image properties of the image data (e.g., an image category).

In some examples, the segmentation module 426 may also classify one or more image segments of the plurality of image segments into an image category of a plurality of predefined image categories, where the image category has a predefined association with one or more items of the plurality of items or one or more persons. For example, the segmentation module 426 may compare one or more properties of the image segment with a set of predefined image categories in image category information 445 to classify the image segments 451 into one or more categories.

The image task module 428 in conjunction with image category information 445 may identify an image processing task, having a predefined association with the first image category and a discrete image segment, and execute the identified image task. In some examples, the image processing task may be based upon the environment 100. For example, the image processing task may be associated with a location and/or type of sensor. For example, acquired image data 450 gathered at a fixed image sensor at a checkout area of environment 100, may automatically be associated to a checkout image processing task (e.g., verify and audit items in the acquired image data 450). In some examples, the image task module 428 may make calls to the virtual transaction record module 430 in order to access, audit, and/or update virtual transaction record information 440. In some examples, virtual transaction record information tracks and updates a virtual transaction record for each person in the environment 100.

In some embodiments, one or more images corresponding to each of the items available in the environment are stored in image category information 445, and the segmentation module 426 and the image task module 428 compares acquired image data 450 and discrete image segments with the stored images in image category information 445 to identify the items and/or within the acquired image data 450. In some embodiments, the segmentation module 426 and/or the image task module 428 may determine one or more properties of items (e.g., size, color, amount of the item that is visible) included in the acquired image data using the image category information 445. The properties may be used to identify items, e.g., where no corresponding stored image is available for comparison. In general, the image task module 428 may transmit the acquired image data 450 and/or image segments 451 to a neural network for processing and subsequent identification. Image task module 428 may then determine an identification of an item (or an image segment) based on the confidence level of the neural network results.

In some examples, the image task module 428 may be configured to determine a processing task to perform based on an image category, such as an image category stored in image category information 445. The image task module 428 may be configured to determine an optimal "target"/API/endpoint to receive and/or perform the processing task based on the category. For example, if the image category is a "box of cereal", the image task module 428 may determine to identify the item within an environment based in-stock stock keeping unit/inventory.

The image task module 428 may be further configured to process the acquired image data 450 using known image processing techniques to detect and identify individuals in the environment. For example, if the image category is a face, the image task module 428 may determine the processing task comprises calling a facial recognition API. In some embodiments, the image task module 428 may perform facial recognition analysis on the acquired image data 450. In some embodiments, the image task module 428 may determine properties of a person included in the acquired image data 450 (e.g., height, spatial proportions, and clothing characteristics). The facial recognition and/or determined properties may be compared with information included in personal profiles stored in memory 410 to determine whether a suitable match is found. For example, a person may have a photograph of their face or body and/or personal information such as demographic information associated with their personal profile. The information and photos may be entered by the person directly, e.g., using a mobile computing device app, and/or determined using data acquired during previous transactions.

Figure 5:
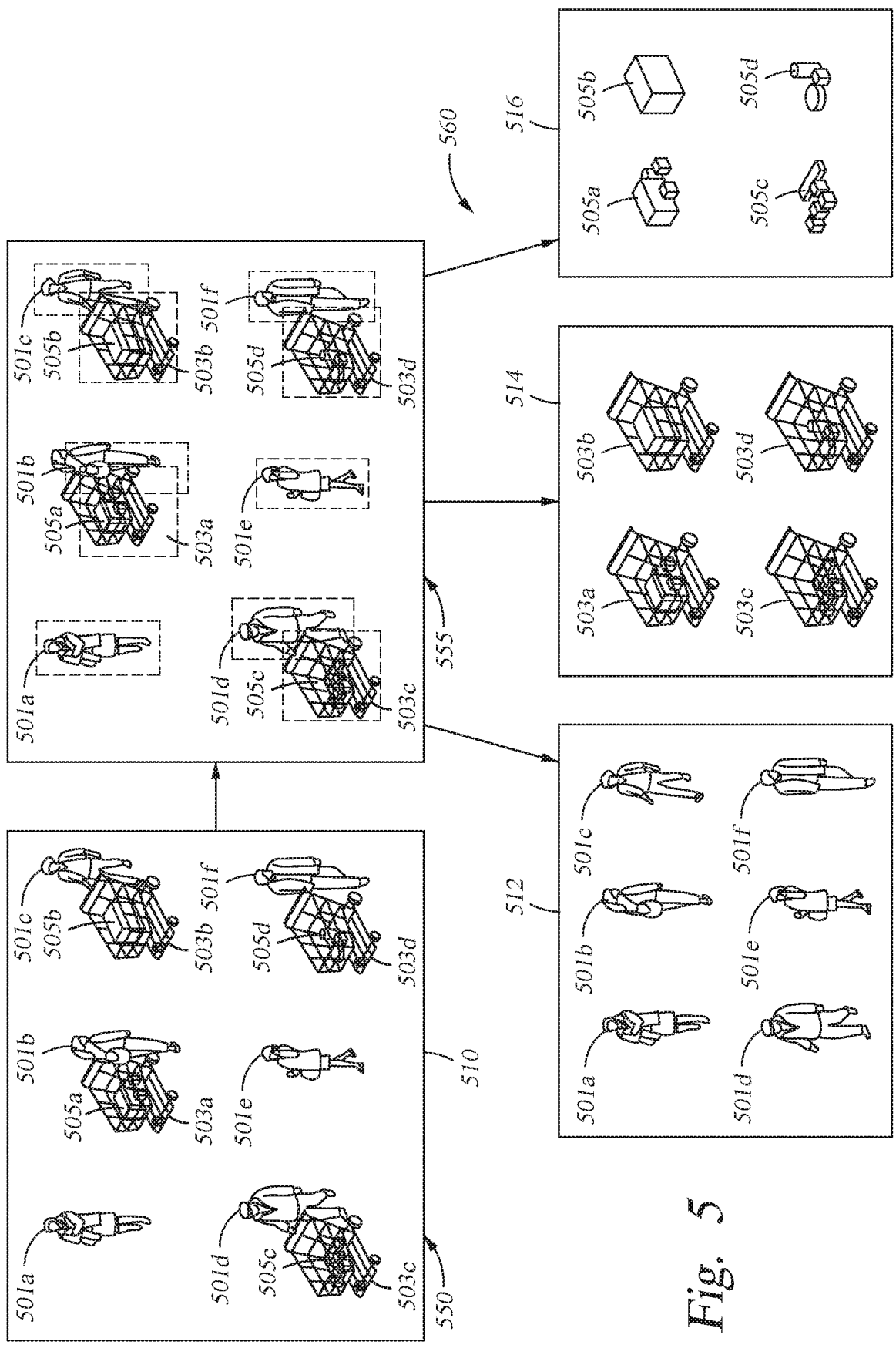
FIG. 5 illustrates segmenting and classifying image data, according to one embodiment.

FIG. 5 illustrates an exemplary sequence of segmenting and classifying image data, according to one embodiment. For example, at step 550, image data 510 is acquired by a visual sensor in an environment 100 and may comprise image data generally representing a portion of the environment 100. In some examples, the environment 100 may be a retail environment with multiple items available for selection and purchase. As shown in FIG. 5, the acquired image data 510 includes persons 501a-501f, shopping receptacles 503a-503d, and items 505a-505d. In some examples, the image data 510 may further include one or more alternate interactions occurring between the persons, shopping receptacles, and/or items, which are not depicted here. For example, a person may be holding an item in their hand instead of a shopping receptacle. Furthermore, shopping receptacles may contain many different and various items. As described in relation to FIG. 4, various portions of the arrangement 400 (e.g., sensors 455) may be used to gather, transmit, and/or store the image data 510 as acquired image data 450.

At step 555, the segmentation module 426, using image category information 445, segments the image data 510 into discrete image segments 512, 514, and 516 stored as image segments 451. As illustrated In FIG. 5, the image segments 512 may include portions of the image data 510 corresponding to persons, the image segments 514 may include portions of the image data 510 corresponding to shopping receptacles (which may include any items included therein), and the image segments 512 may include portions of the image data 510 corresponding to items.

At step 560, the segmentation module 426, using image category information 445, classifies one or more of the image segments 512, 514, and 516, of the plurality of image segments into one or more image categories of a plurality of predefined image categories found in the image category information 445. Each of the image categories may have a predefined association with one or more items of the plurality of items, and/or with one or more persons in each of the image segments. As shown, certain image data may be included in one or more image segments and/or image categories.

While not shown in FIG. 5 for simplicity, the associated image categories may be defined using any suitable criteria. In some embodiments, the image categories may include one or more of: high value items, low value items, grocery items, restricted items (such as alcohol and tobacco), branded items, etc. For example, the segmentation module 426, using image category information 445, may segment and classify particular image data 510 as corresponding to a high value item, thus requiring a higher level of scrutiny and/or auditing at a checkout image processing task. In another example, the segmentation module 426, using the image category information 445, may segment and classify particular image data 510 as corresponding to restricted items, thus signifying that an age verification image processing task needs to be performed.

Figure 6:
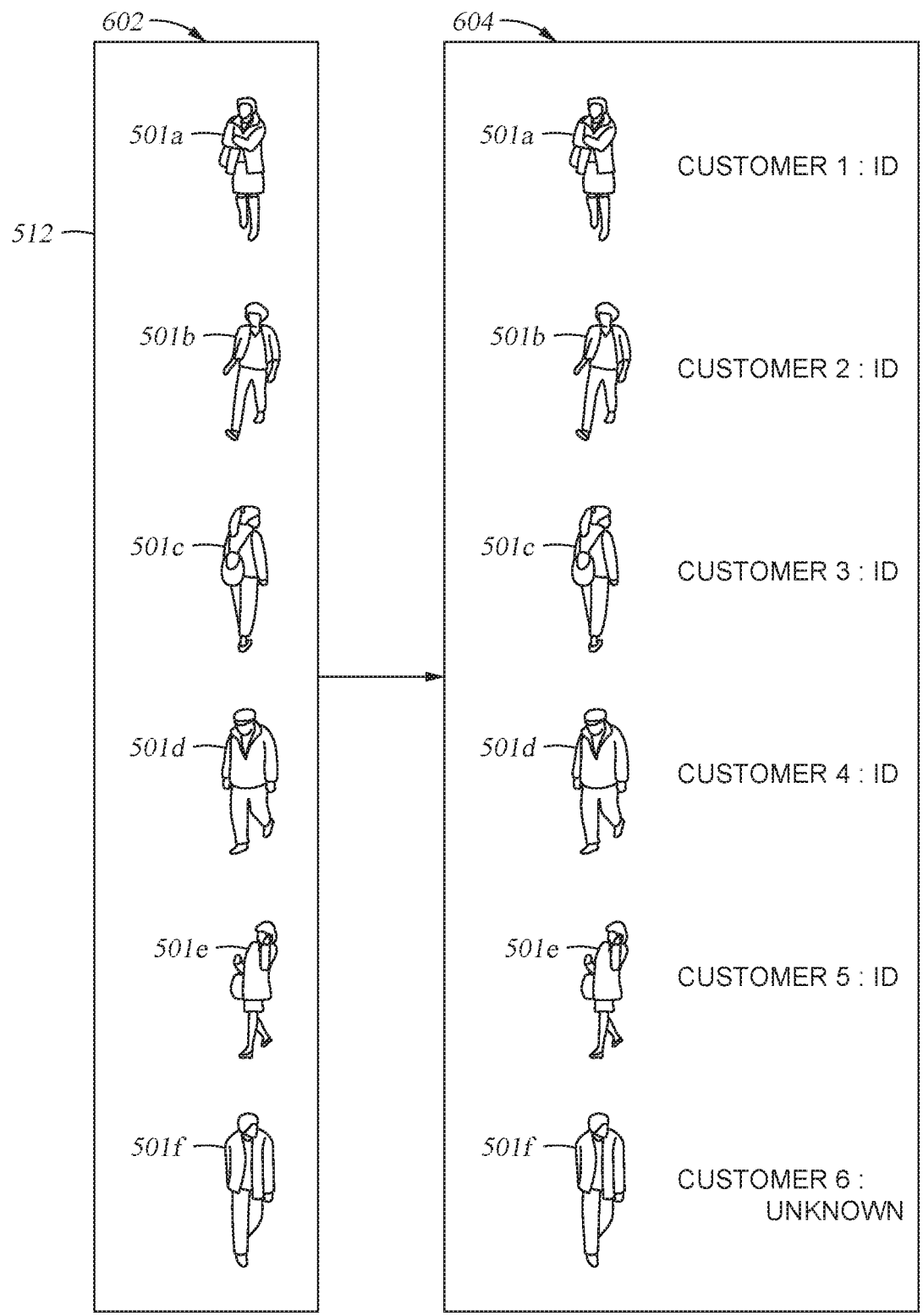
FIG. 6 illustrates executing an exemplary image processing task, according to one embodiment.

FIG. 6 illustrates executing an exemplary image processing task, according to one embodiment. As shown, at step 602, the image task module 428 (FIG. 4) using image category information 445, may be configured to identify an image processing task having a predefined association with the first image category. In some embodiments, different image categories of the plurality of predefined image categories are associated with different image processing tasks. For example, image segments 512 may be associated with a "persons" image category and contains all of the image data relating to persons in the environment 100. In one example, the image processing task associated with the "persons" image category may include identifying the persons 501a-501f, using facial recognition or other identifying image information.

As shown, at step 604, the image task module 428 executes the image processing task and identifies each of the persons in the image segment 512. For example: person 501a may be identified as Customer 1 and include an ID, such as name, address, payment information etc. Persons 501b-e may also be identified as Customers 2-5 respectively. In one example and a shown in FIG. 5, person 501f may not be identified. In some examples, a processing task request to identify person 501f through a manual or other method may be added to the task request queue: In some examples, image task module 428 in conjunction with virtual transaction module 430 and virtual transaction record 440, creates or updates a virtual tracking record for each identified and unidentified person.

Figure 7:
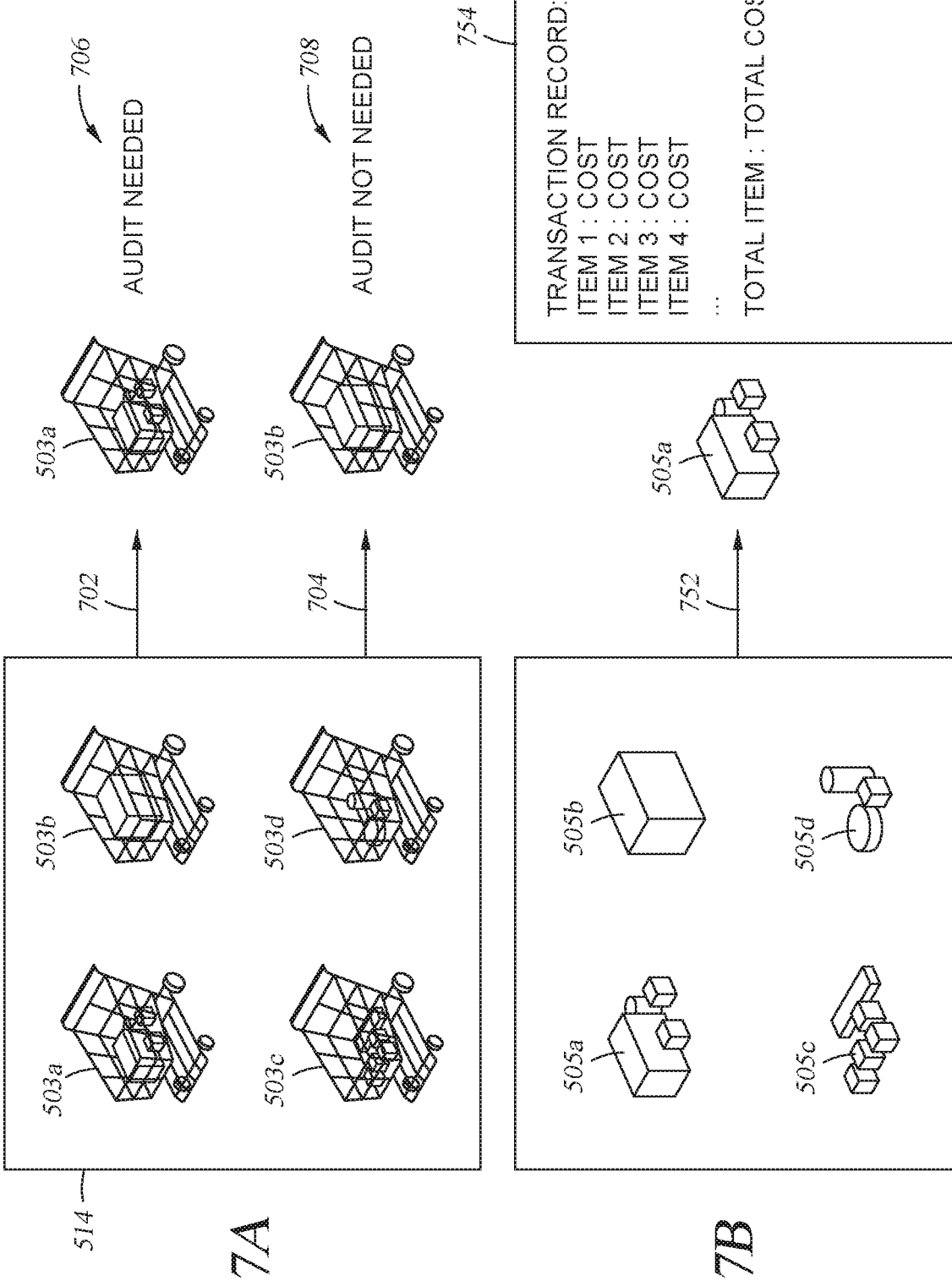
FIGS. 7A and 7B illustrate executing exemplary image processing tasks, according to example embodiments.

FIG. 7A illustrates executing another exemplary image processing task, according to one embodiment. As shown, at step 702, image task module 428 using image category information 445, may be configured to identify the image segments 514 as corresponding to a "high value" category, indicating there is a high value item in the image data and in this instance the shopping receptacle. In this example, the predefined association comprises an association of the image segment with high value items of the plurality of items. For example, as shown image segments 514 are associated with a shopping receptacles 503a-503d including high value items. In one example, image task module 428 in conjunction with virtual transaction record module 430 and virtual transaction record 440, may determine that an audit of shopping receptacle 503a is needed (e.g., audit needed 706). For example, if an associated virtual transaction record does not include the high value item, an audit of the shopping receptacle and/or virtual transaction record may be instructed by the system. In some examples, the image processing task comprises an audit of a shopping receptacle by comparing a transaction record of a person associated with the shopping receptacle with items identified as being included in the shopping receptacle.

As shown, at step 704, image task module 428 in conjunction with virtual transaction record module 430 and virtual transaction record 440, may determine that an audit of shopping receptacle 503a is not needed (e.g., audit not needed 708). For example, if an associated virtual transaction record does include the high value item identified as being included in the shopping receptacle, an audit of the shopping receptacle and/or virtual transaction record may not be needed.

FIG. 7B illustrates executing another exemplary image processing task, according to one embodiment. As shown, at step 752, image task module 428 using image category information 445, may be configured to identify the image segments 516 as corresponding to an "items selected for purchase" category, indicating that a person has selected the item for purchase. In this example, the predefined association comprises an association of the image segment with items selected for purchase of the plurality of items. Some examples of items selected for purchase include items identified as being in a shopping receptacle and/or in a person's possession (e.g., in a person's hand). For example, as shown image segment 516 includes image data that has been selected for purchase. In one example, image task module 428 in conjunction with image category information 445, may identify each of the items in items 505a as part of image segment 516. For example, the items may be identified as item 1, item 2, item 3, and item 4. Each item may also have an associated cost.

As shown, at step 754, image task module 428 in conjunction with virtual transaction record module 430 and virtual transaction record 440, may update a virtual transaction record for an associated person with each of the identified items and their cost. In some examples, the cost may be used to calculate a total transaction cost. In some examples, the cost may be used to determine if an audit of the shopping receptacle and virtual transaction record is needed.

Figure 8:
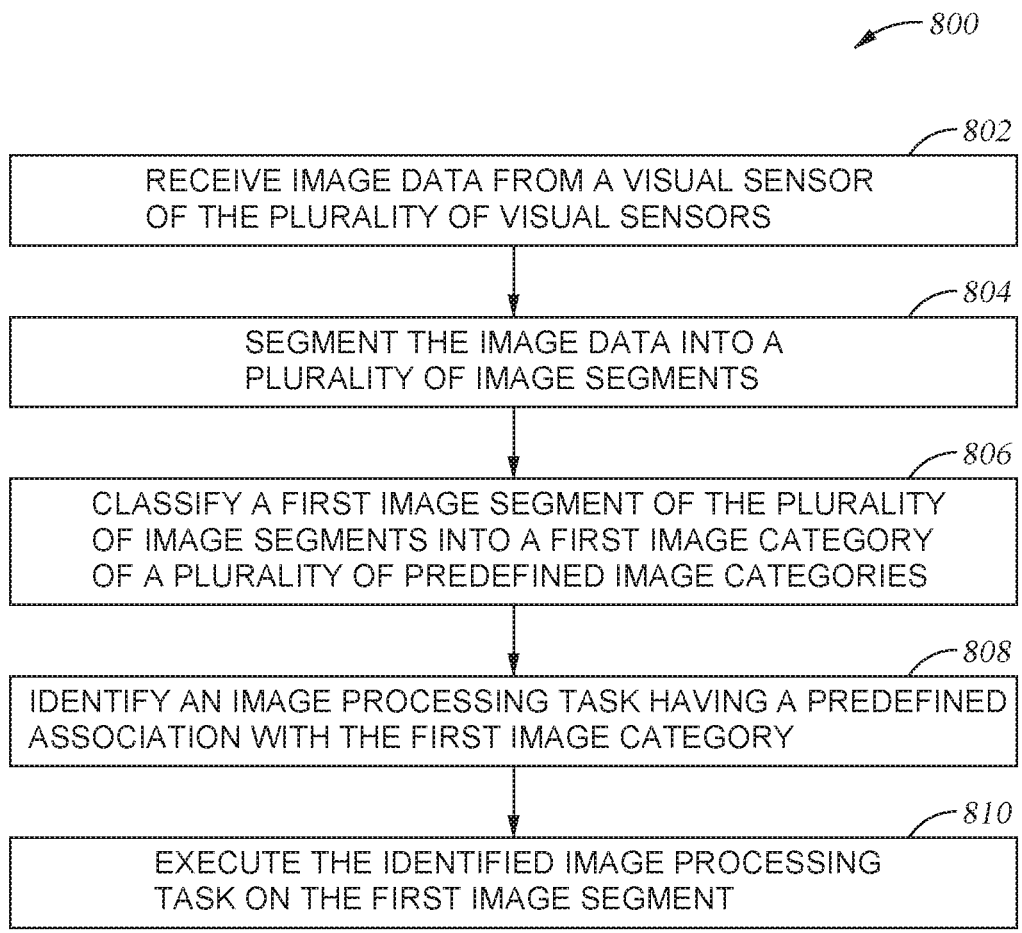
FIG. 8 illustrates a method to provide efficient processing of image data representing an environment, according to one embodiment.

FIG. 8 illustrates a method to provide efficient processing of image data representing an environment, according to one embodiment. Method 800 begins at block 802, where image data (such as acquired image data 450) is received from a visual sensor (e.g., visual sensor 456 of FIG. 4) of the plurality of visual sensors (e.g., sensors 455). This allows for a visual sensor, such as a camera, to collect image data once and have the individual aspects of the image data used for several different image processing tasks.

At block 804, the system segments the image data into a plurality of image segments. In some examples, block 804 can be accomplished by segmentation module 426 in conjunction with image category information 445.

At block 806, the system classifies, using segmentation module 426 in conjunction with image category information 445, a first image segment of the plurality of image segments into a first image category of a plurality of predefined image categories, wherein the first image category has a predefined association with one or more items of the plurality of items or one or more persons. The predefined image categories can include for example: persons, high value items, low value items, grocery items, restricted items, and branded items. In some examples, classifying a first image segment of the plurality of image segments into a first image category of a plurality of predefined image categories comprises comparing one or more properties of the first image segment with a set of predefined image categories, such as predefined image categories stored in image category information 445.

At block 808, the system identifies, using image task module 428 in conjunction with image category information 445, an image processing task having a predefined association with the first image category, wherein different image categories of the plurality of predefined image categories are associated with different image processing tasks. In some examples, the image processing tasks may include item identification processing, environment auditing processing, item value calculation processing, and verification processing. In some examples, identifying an image processing task having a predefined association with the first image category comprises comparing one or more properties of the classification with a set of predefined image processing task properties, such as predefined image tasks stored in image category information 445.

At block 810, the system executes, using image task module 428, the identified image processing task on the first image segment. In one example, when the first image category is a persons category and when the predefined association comprises an association of the image segment with the one or more persons, the image processing task comprises identifying, using a facial recognition processing, the one or more persons of the first image segment (as described in relation to FIG. 6).

In another example, when the first image category is an items selected for purchase category and the predefined association comprises an association of the image segment with items selected for purchase of the plurality of items, the image processing task comprises identifying the one or more items selected for purchase from the image segment, and updating a virtual transaction record with the one or more identified items (as described in relation to FIG. 7B).

In another example, when the first image category is a high value category, and the predefined association comprises an association of the image segment with high value items of the plurality of items, the image processing task comprises an audit of a shopping receptacle by comparing a transaction record of a person associated with the shopping receptacle with items in the shopping receptacle (as described in relation to FIG. 7A).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method to provide efficient processing of image data representing an environment comprising a plurality of items available for selection by one or more persons, the environment comprising a plurality of visual sensors distributed throughout the environment, the method comprising:

receiving image data from a visual sensor of the plurality of visual sensors;

segmenting the image data into a plurality of image segments, wherein each image segment of the plurality of image segments comprises associated discrete parts of the image data stored as the image segment in a memory device;

classifying a first image segment of the plurality of image segments into a first image category of a plurality of predefined image categories, wherein the first image category has a predefined association with one or more items of the plurality of items or one or more persons, wherein the first image segment comprises associated discrete parts of the image data stored in the memory device as the first image segment and wherein the stored image data of the first image segment comprises image data associated with the first image category;

identifying at least one image processing task, wherein the at least one image processing task comprises a predefined association with the first image category and a predefined association with a location of the visual sensor, wherein different image categories of the plurality of predefined image categories are associated with different image processing tasks; and executing the identified image processing task on the first image segment, wherein the image processing task processes only the image data associated with the first image segment.

2. The method of claim 1, wherein the first image segment comprises one or more persons, wherein the first image category is a persons category, wherein the predefined association with the first image category comprises an association of the image segment with the one or more persons; and wherein the at least one image processing task comprises:
identifying, using a facial recognition processing, the one or more persons of the first image segment.

3. The method of claim 1, wherein the first image segment comprises one or more items of the plurality of items, wherein the first image category is an items selected for purchase category, wherein the predefined association with the first image category comprises an association of the image segment with items selected for purchase of the plurality of items; and wherein the at least one image processing task comprises:
identifying the one or more items selected for purchase from the image segment; and
updating a virtual transaction record with the one or more identified items.

4. The method of claim 1, wherein the first image segment comprises one or more items of the plurality of items, wherein the first image category is a high value category, wherein the predefined association with the first image category comprises an association of the image segment with high value items of the plurality of items; and wherein the at least one image processing task comprises an audit of a shopping receptacle by comparing a transaction record of a person associated with the shopping receptacle with items in the shopping receptacle.

5. The method of claim 1, wherein the plurality of predefined image categories comprises one or more of:
high value items;
low value items;
grocery items;
restricted items; and
branded items.

6. The method of claim 1, wherein the image processing tasks comprise one or more of:
item identification processing;
environment auditing processing;
item value calculation processing; and
verification processing.

7. The method of claim 1, further comprising:
classifying a subsequent image segment of the plurality of image segments into a subsequent image category of the plurality of predefined image categories, wherein the subsequent image category has a subsequent predefined association with one or more items of the plurality of items or one or more persons;

identifying an image processing task having a subsequent predefined association with the subsequent image category, wherein different image categories of the plurality of predefined image categories are associated with different image processing tasks; and executing the identified image processing task on the subsequent image segment.

8. The method of claim 1, wherein classifying a first image segment of the plurality of image segments into a first image category of a plurality of predefined image categories, comprises comparing one or more properties of the first image segment with a set of predefined image categories; and wherein identifying an image processing task having a predefined association with the first image category comprises comparing one or more properties of the classification with a set of predefined image processing task properties.

9. A system, to provide efficient processing of image data representing an environment comprising a plurality of items available for selection by one or more persons, the system comprising:
one or more computer processors;
a plurality of visual sensors distributed throughout the environment;
a memory containing program code which, when executed by the one or more computer processors, performs an operation comprising:
receiving image data from a visual sensor of the plurality of visual sensors;
segmenting the image data into a plurality of image segments, wherein each image segment of the plurality of image segments comprises associated discrete parts of the image data stored as the image segment in a memory device;
classifying a first image segment of the plurality of image segments into a first image category of a plurality of predefined image categories, wherein the first image category has a predefined association with one or more items of the plurality of items or one or more persons, wherein the first image segment comprises associated discrete parts of the image data stored in the memory device as the first image segment and wherein the stored image data of the first image segment comprises image data associated with the first image category;
identifying at least one image processing task, wherein the at least one image processing task comprises a predefined association with the first image category and a predefined association with a location of the visual sensor, wherein different image categories of the plurality of predefined image categories are associated with different image processing tasks; and
executing the identified image processing task on the first image segment, wherein the image processing task processes only the image data associated with the first image segment.

10. The system of claim 9, wherein the plurality of predefined image categories comprise one or more of:
human faces;
high value items;
low value items;
grocery items;
restricted items; and branded items; and wherein the image processing tasks comprise one or more of:
- facial recognition processing;
- item identification processing;
- environment auditing processing;
- item value calculation processing; and
- verification processing.

11. The system of claim 9, wherein the operation further comprises:
- identifying a subsequent image processing task associated with at least one of plurality of predefined image categories;
- selecting subsequent image data in the predefined image category associated with the identified subsequent image processing task; and
- executing the subsequent image processing task using only the selected subsequent image data.

12. The system of claim 9, wherein the environment comprises a retail environment and wherein the efficient processing of image data is a component of a retail checkout process.

13. The system of claim 9, wherein the image data received from a visual sensor comprises general image data representing a non-specific section of the environment.

14. A computer program product for a method to provide efficient processing of image data representing an environment comprising a plurality of items available for selection by one or more persons, the environment comprising a plurality of visual sensors distributed throughout the environment, the computer program product comprising:
- a computer-readable storage medium having computer-readable program code embodied therewith, the computer-readable program code executable by one or more computer processors to perform an operation that includes:
  - receiving image data from a visual sensor of the plurality of visual sensors;
  - segmenting the image data into a plurality of image segments, wherein each image segment of the plurality of image segments comprises associated discrete parts of the image data stored as the image segment in a memory device;
  - classifying a first image segment of the plurality of image segments into a first image category of a plurality of predefined image categories, wherein the first image category has a predefined association with one or more items of the plurality of items or one or more persons, wherein the first image segment comprises associated discrete parts of the image data stored in the memory device as the first image segment and wherein the stored image data of the first image segment comprises image data associated with the first image category;
  - identifying at least one image processing task, wherein the at least one image processing task comprises a predefined association with the first image category and a predefined association with a location of the visual sensor, wherein different image categories of the plurality of predefined image categories are associated with different image processing tasks; and
  - executing the identified image processing task on the first image segment, wherein the image processing task processes only the image data associated with the first image segment.

15. The computer program product of claim 14, wherein the predefined image categories comprise one or more of:
- human faces;
- high value items;
- low value items;
- grocery items;
- restricted items; and
- branded items; and wherein the image processing tasks comprise one or more of:
- facial recognition processing;
- item identification processing;
- environment auditing processing;
- item value calculation processing; and
- verification processing.

16. The computer program product of claim 14, wherein the operation further includes:
- identifying a subsequent image processing task associated with at least one of the plurality of predefined image categories;
- selecting subsequent image data in the predefined image category associated with the identified subsequent image processing task; and
- executing the subsequent image processing task using only the selected subsequent image data.

17. The computer program product of claim 14, wherein the environment comprises a retail environment and wherein the efficient processing of image data is a component of a retail checkout process.

18. The computer program product of claim 14, wherein the image data received from a visual sensor comprises general image data representing a non-specific section of the environment.

\* \* \* \* \*